United States Patent [19]

MacKenzie, Jr.

[11] 4,020,214

[45] Apr. 26, 1977

[54] METHOD OF MAKING AN INSULATED ELECTRICAL CONDUCTOR USING PRESSURELESS CURING OF FILLED ETHYLENE CONTAINING POLYMERIC COMPOSITIONS, AND AN INSULATED CONDUCTOR FORMED THEREBY

[75] Inventor: Burton Thornley MacKenzie, Jr., Monroe, Conn.

[73] Assignee: General Electric Company, New York, N.Y.

[22] Filed: Nov. 28, 1975

[21] Appl. No.: 626,246

Related U.S. Application Data

[62] Division of Ser. No. 372,084, June 21, 1973, Pat. No. 3,923,731.

[52] U.S. Cl. ............... 428/389; 174/110 PM; 264/174; 264/272; 427/120; 427/385 R; 427/388 A; 428/372; 428/379; 428/390

[51] Int. Cl.² ............... B32B 9/00; B32B 15/00; B05D 5/12; B29F 3/10

[58] Field of Search ........ 428/379, 375, 372, 383, 428/389, 390; 427/388, 384, 385, 117, 120, 385 R, 388 A; 174/110 R, 110 PM, 110 SR; 264/174, 272

[56] References Cited

UNITED STATES PATENTS

| | | | |
|---|---|---|---|
| 2,921,872 | 1/1960 | McGlamery | 428/379 |
| 2,921,873 | 1/1960 | Rogers | 428/379 |
| 3,148,169 | 9/1964 | Martens et al. | 428/379 |
| 3,342,637 | 9/1967 | Jaffe | 428/379 |
| 3,773,556 | 11/1973 | Rowland et al. | 428/379 |

*Primary Examiner*—Lorraine T. Kendell
*Attorney, Agent, or Firm*—R. G. Simkins; P. L. Schlamp; F. L. Neuhauser

[57] ABSTRACT

A method for curing mineral filled, ethylene-containing polymeric compositions with heat and without applying high pressures, which produces relatively dense and substantially non-porous cured polymeric products. The method comprises the addition of an organic titanate to a curable, mineral filled polymeric composition, and heat curing the composition at approximately ambient atmospheric pressures.

8 Claims, 1 Drawing Figure

METHOD OF MAKING AN INSULATED ELECTRICAL CONDUCTOR USING PRESSURELESS CURING OF FILLED ETHYLENE CONTAINING POLYMERIC COMPOSITIONS, AND AN INSULATED CONDUCTOR FORMED THEREBY

This is a division of application Ser. No. 372,084, filed June 21, 1973, now U.S. Pat. No. 3,923,731.

BACKGROUND OF THE INVENTION

The curing of many types of polymeric materials by means of the application of heat to activate a curing agent, or simply to incite chemical activity effecting the cure such as a cross-linking, often requires a commensurate application of high ambient pressure to offset or overcome the effects of the high curing temperatures. Unrestrained by either the confines of an enclosing mold or high ambient pressures, many common polymers are susceptible to softening and deformation at curing temperatures prior to completion of the thermosetting cure, and the high curing temperatures cause the generation or evolution of volatile gases within and about the body of the polymeric material undergoing curing. The occurrence and/or expansion of such gases in the softened and deformable polymeric material forms cells or voids within the body, resulting in a porous and low density mass of irregular consistency.

Heat curing operations for many polymeric compositions are therefore often performed within a closed chamber or steam autoclave wherein the hot confined steam, or other heated gas under high pressure provides both the high temperatures and the restraining high ambient pressure about the body undergoing curing. "Pressureless" curing systems carried out at approximately ambient atmospheric pressure conditions are of course employed in the manufacture of many types of products. However, as indicated above, and also pointed out in page 69 of an article entitled "The Continuous Vulcanization of Solid And Cellular Profiles" by C. H. Gregory, appearing in the *Rubber Journal* of September 1966, the materials cured at ambient atmospheric pressure conditions generally develop considerable porosity.

Porosity, or the presence of voids or cells in a composition comprises a definite shortcoming in some types of products, and an adverse condition which cannot be tolerated in others. For instance, voids or gas cells are especially detrimental in electrical insulations, and many recent U.S. patents are addressed to the problem of porosity in electrical insulations, viz.: U.S. Pat. Nos. 3,522,183; 3,527,874; 3,629,110; and 3,666,876. The propensity of many polymeric materials, and particularly polyolefins such as polyethylene, to develop pores during heat curing, has required a practical matter the manufacturers of insulated electrical conductors to cure their polymeric insulated products under high pressure with the attendant high costs, although pressureless curing systems are effective in some other industries or products wherein the presence of pores is not a significant factor.

SUMMARY OF THE INVENTION

This invention comprises the discovery that the presence of a minor amount of an organic titanate in curable, mineral filled polymeric compositions containing ethylene, enables their curing at high temperatures to a relatively dense and substantially non-porous, uniform consistency or physical state without applying high pressures. The invention thus includes an improved method of curing mineral filled polymeric compositions containing ethylene and the dense and pore free products of the method.

It is, therefore, the principal object of this invention to provide an effective and economical means of curing polymeric materials without the expense and encumbrance of applying increased pressures about the material or article undergoing curing, and which overcomes the defects of previous pressureless or atmospheric pressure curing systems, in particular the occurrence of porosity, low and/or irregular densities, and the presence of voids through the body of the cured product.

It is also an object of this invention to provide relatively dense and substantially non-porous products of cured, mineral filled polymeric compositions containing ethylene.

It is a further object of this invention to provide a new composition of mineral filled polymer containing ethylene which cures to a relatively dense and substantially pore free, uniform consistency.

It is additionally an object of this invention to provide a method and composition for the manufacture of relatively dense and essentially pore free electrical insulating products such as insulated wire and cables or other conductors.

DETAILED DESCRIPTION OF A PREFERRED EMBODIMENT

Figure 1:
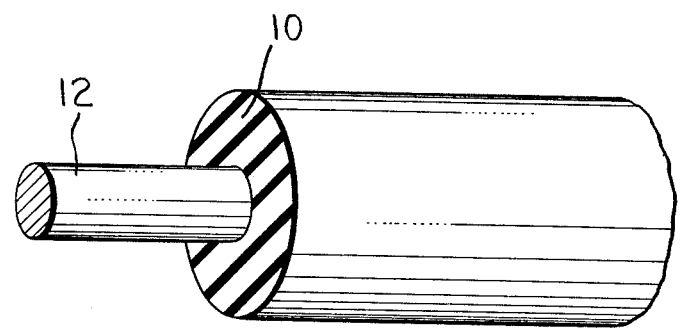
FIG. 1 comprises a perspective view of a section of conductor insulated with a composition of this invention.

This invention relates generally to thermosetting or cross-linkable, mineral filled polymeric compositions mainly composed of polymerized ethylene, and provides an advantageous means of effecting a heat induced cure therein and producing an improved cured product.

Although the described embodiment of this invention is specifically concerned with, and is hereafter disclosed in connection with polymeric compositions intended for use as insulations for electrical conductors, it is to be understood that the invention applies to the manufacture of any type of products wherein pressureless curing of a curable polymeric composition is advantageous, and/or the attainment of a uniform, relatively dense and pore free material is a desired or significant property of the cured product.

Thermosetting curable polymeric compositions for the practice of this invention comprise ethylene-containing polymers, a cross-linking curing agent, mineral filler, and an organic titanate. In addition to the foregoing basic ingredients, the composition optionally may include any conventional additives or materials such as preservatives or antioxidants, processing aids or releasing agents, pigments, and the like Ethylene-containing polymers for the practice of this invention comprise polyethylene, copolymers of ethylene and other polymerizable materials, and blends of polymers or copolymers of ethylene with other polymeric materials. Suitable copolymers of ethylene comprise ethylenevinyl acetate, ethylene-propylene rubber, and ethylene-propylene terpolymers ("EPDM"). These comprise polymerized materials which are mainly ethylene in content, for example a typical ethylene-propylene copolymer or terpolymer contains at least about 50% by weight of ethylene and generally about 50 to 75% thereof, whereas copolymers of ethylene-vinyl acetate contain about 70 to 95% by weight of ethylene.

The ethylene-containing polymers comprising polyethylene, blends or copolymers of ethylene, also may be combined with chlorine containing polymers such as chlorinated polyethylene, chlorosulfonated polyethylene, or polyvinyl chloride, to provide flame resistance in the composition.

Mineral fillers suitable for the compositions of the invention include those commonly employed in many filled polymeric materials such as oxides and silicates of di- and trivalent metals, and silica. Specific examples of mineral fillers comprise clays or aluminum silicate, aluminum oxide, calcium silicates, magnesium silicates, magnesium oxide, titanium dioxide, particulate glass, and natural sources of silica such as flint, quartz, and crystobalite. Such fillers in conventional fine particle sizes may be included in the ethylene-containing polymer is amounts of about 15 to 200 parts by weight per 100 parts of the polymer content, and preferably about 25 to 150j parts by weight thereof.

Curing agents for the practice of the invention comprise those materials which will effect a cross-linking of the ethylene-containing polymer such as organic peroxides which decompose upon exposure to increased temperatures to provide free radicals. Tertiary peroxides such as diαcumyl peroxides are preferred because their temperature levels for decomposition and incitement of the cross-linking curing are in a practical range for most manufacturing operations. Suitable peroxides and curing systems for ethylene containing polymeric materials are further described in U.S. Pat. Nos. 2,888,424; 3,079,370; 3,086,966; and, 3,214,422. Specific tertiary diperoxides include 2, 5 - dimethyl- 2, 5 (t-butyl peroxy) hexane; 2, 5 -dimethyl- 2, 5 - (t-butyl peroxy) hexyne- 3; d, α' -bis (t-butyl peroxy) diisopropylbenzene; and similar diperoxy compounds.

The ratio of peroxide curing agent to the ethylene-containing polymer material depends primarily upon the physical and chemical properties required in the cured product such as the degree of solvent resistance or hot tensile strength. Amounts of peroxide curing agent of from about 0.5 to 10 parts by weight per 100 parts of polymeric material generally satisfy most requirements, and typically proportions of about 2 to 5 parts by weight suffice for most electrical insulating service.

The organic titanates used in this invention consists of tetrakis (2-ethylhexyl) titanate, which is available as a product of the E. I. DuPont Company marketed under the trade designated of "TYZOR" TOT, tetrabutyl titanate, available as DuPont's TYZOR TBT, and also DuPont's TYZOR AP consisting of a mixed alkyl titanate of about 85 parts by weight $C_3$ (isopropyl) and about 15 parts by weight $C_{18}$ (stearyl ±5 parts. These organic titanates are included in the curable mineral filled composition comprising ethylene in amounts of about 2 to 10 parts by weight per 100 parts of the mineral filler content, and preferably about 4 to 8 parts by weight thereof.

The ingredients of the curable composition, including the ethylene containing polymer, cross-linking curing agent, mineral filler, and the organic titanate, and any additional additives, should be uniformly blended together providing a substantially homogeneous consistency. Conventional polymer compounding apparatus such as a Banbury mixer, heated roll mill or a mixing screw extruder can be utilized. However, it is generally preferred according to usual compounding procedures for this type of curable copolymers to first blend all ingredients, other than the heat decomposable peroxide curing agent, at a relatively high temperature to facilitate fluxing of the polymer material and the dispersion of the other ingredients therethrough. Thereafter, upon cooling the initial blend to a level below the decomposition temperature of the particular peroxide, the peroxide curing agent is introduced and dispersed through the blend.

The following comprise examples demonstrating the effects of this invention in relation to the prior art practices and the influence of similar organo titanates. Each exemplary composition given, the ingredients of which are specified in relative parts by weight, was prepared under identical and conventional conditions on a heated two roll unit. Namely, all ingredients other than the peroxide curing agent, were combined together and blended on the mill heated to a temperature of about 200° F for a period of about 15 minutes. The peroxide curing agent was then added to the initial blend and dispersed through the blend by a brief mixing for about 3 minutes on the mill. Like samples of the composition of each example were molded into specimen slabs measuring 4.5 inches square and about 75 mils thick, and then cured for 2 minutes at 400° C immersed in polyalkylene glycal (Ucon LB-300-X, Union Carbide) at atmospheric pressure conditions.

The compositions and their cured physical state was as follows:

| INGREDIENTS | EXAMPLES | | |
| --- | --- | --- | --- |
| | I | II | III |
| Polyethylene | 100 | 100 | 100 |
| Calcined Clay | 50 | 50 | 50 |
| Antioxidant (Flectol H, Monsanto) (polymerized trimethyl hydroquinoline) | 1 | 1 | 1 |
| Di αcumyl peroxide curing agent | 3.38 | 3.38 | 3.38 |
| Titanium glycolate chelate (TYZOR OG, DuPont) | — | 3 | — |
| Tetrakis (2-ethylhexyl) titanate (TYZOR TOT, DuPont) | — | — | 3 |
| PROPERTIES | | | |
| Degree of Porosity | Some Pores | Very Porous | Pore Free, Very Dense |
| Toluene Extract | 13.6 | 16.4 | 14.1 |

The toluene extraction test demonstrates the degree of cure achieved, and is obtained by treating a 2 gram sample of the cured composition for 16 hours in boiling toluene in accordance with ASTM D-297.

The compositions of the following examples were prepared under the same conditions as in the above examples, except that the specimen slabs formed from each composition was cured in silicone oil for 2 minutes at 400° F. These compositions and their cured physical state was as follows:

| INGREDIENTS | EXAMPLES | | | |
| --- | --- | --- | --- | --- |
| | IV | V | VI | VII |
| Polyethylene | 100 | 100 | 100 | 100 |
| Calcined Clay | 50 | 50 | 50 | 50 |
| Antioxidant (Electrol H) | 1 | 1 | 1 | 1 |
| Dicumyl peroxide curing agent | 3.38 | 3.38 | 3.38 | 3.38 |
| Tetrastearyl titanate | | | | |

-continued

| INGREDIENTS | EXAMPLES | | | |
|---|---|---|---|---|
| | IV | V | VI | VII |
| (TYZOR TST, DuPont) Tetraisopropyl titanate | 3 | — | — | — |
| (TYZOR TPT, DuPont) Tetrabutyl titanate | — | 3 | — | — |
| (TYZOR TBT, DuPont) Mixed alkyl titanate | — | — | 3 | — |
| (TYZOR AP, DuPont comprising about 85 parts by wt. C₃ and about 15 parts by wt. C₁₈ | — | — | — | 3 |
| Degree of porosity | Porous | Some Pores | Few Pores | Few Pores |

This invention applies to substantially all heating systems or techniques for effecting pressureless curing of polymeric thermosetting materials, including heating the curable material by the application of a fluid heat transmitting medium such as hot gases or liquids, including molten metals or salts, within an environment of ambient atmospheric pressure conditions. A primary requirement of such a technique of curing without applying increased pressures is that the particular heating medium be relatively inert with respect to the material being cured, and when a liquid comprises the heating medium, it should have a boiling point above the temperature level of the curing operation since the curing is carried out at approximately atmospheric pressure conditions. In any case the curing system is not sealed closed to the ambient atmosphere, and internal pressures are not raised intentionally or encountered above that simply resulting from the circulation of a gaseous heating medium, or the weight of a liquid in a heating bath.

Effective pressureless curing systems for use in carrying out this invention comprise simply heating in an oven, contacting the curable composition with hot gases or immersion in a hot liquid under normal ambient conditions.

This invention is particularly useful in the manufacture of polymer insulated electrical conductors because it facilitates the heat curing of continuously produced lengths of insulated wire or cable emerging from an extruder by obviating any need for cumbersome and costly high pressure conditions or chambers, while producing a uniformly and relatively dense, pore free cured polymer insulation about the conductor. Thus, the invention enables the manufacture of high grade electrical insulated conductors at a substantial savings and advantage over previous curing systems.

In accordance with one embodiment of this invention, the relatively dense and substantially non-porous cured product of the method comprises a dielectric insulation 10 for a conductor 12, substantially as shown in the drawing. For example a curable, filled compound of this invention, such as the composition of Example 3, can be coated or molded about a wire conductor 12 by conventional means, and thereafter heat cured by passing the covered wire through a heated liquid or gas medium of suitable temperature to induce the cure, at ambient atmospheric pressure conditions. The insulated conductor products of this invention provide the advantage of pore free insulations of uniform consistency.

Although the invention has been described with reference to certain specific embodiments thereof, numerous modifications are possible and it is desired to cover all modifications falling within the spirit and scope of this invention.

What I claim as new and desire to secure by Letters Patent of the United States is:

1. A method of making an insulated electrical conductor having a cured, relatively dense and substantially non-porous insulation comprising polymerized ethylene and mineral filler, comprising the steps of:
   a. preparing a curable polymeric insulating composition by mixing the ingredients thereof in the given approximate relative parts by weight, comprising: an ethylene-containing polymer; peroxide curing agent in an amount of about 0.5 to 10 parts per 100 parts of the ethylene-containing polymer; mineral filler in amount of about 15 to 200 parts per 100 parts of the ethylene-containing polymer; and at least one organic titanate selected from the group consisting of tetrakis (2-ethylhexyl) titanate, tetrabutyl titanate, and a mixed alkyl titanate comprising about 85 parts isopropyl $C_3$ by weight and about 15 parts stearyl $C_{18}$ by weight in an amount of about 2 to 10 parts per 100 parts of mineral filler;
   b. forming the prepared curable polymeric insulating composition about a conductor; and
   c. heating the curable polymeric insulation composition formed about the conductor under substantially ambient atmospheric pressure conditions and thereby curing said polymeric composition to a relatively dense and substantially non-porous cured insulation.

2. The method of claim 1, wherein the ethylene-containing polymer is selected from the group consisting of polyethylene, copolymers of ethylene and vinyl acetate, copolymers of ethylene and propylene, and terpolymers of ethylene and propylene with a diene, and mixture thereof.

3. The method of claim 2, wherein the ethylene-containing polymer comprises polyethylene, and the mineral filler comprises clay.

4. A method of making an insulated electrical conductor having a cured, relatively dense and substantially non-porous insulation comprising polymerized ethylene and mineral filler, comprising the steps of:
   a. preparing a curable polymeric insulating composition by mixing the ingredients thereof in the given approximate relative parts by weight comprising: an ethylene-containing polymer selected from the group consisting of polyethylene, copolymers of ethylene and vinyl acetate, copolymers of ethylene and propylene, and terpolymer of ethylene and propylene with a diene, and mixture thereof; tertiary organic peroxide curing agent in an amount of about 0.5 to 10 parts per 100 parts of the ethylene-containing polymer; mineral filler in an amount of about 25 to 150 parts per 100 parts of the ethylene-containing polymer; and, at least one organic titanate selected from the group consisting of tetrakis (2-ethylhexyl) titanate, tetrabutyl titanate, and a mixed alkyl titanate comprising about 85 parts isopropyl $C_3$ by weight and about 15 parts stearyl $C_{18}$ by weight in an amount of about 4 to 8 parts per 100 parts of mineral filler;
   b. forming the prepared curable polymeric insulating composition about a conductor; and,
   c. heating the curable polymeric insulation composition formed about the conductor under substantially ambient atmospheric pressure conditions and thereby curing said polymeric compositions to a relatively dense and substantially non-porous cured insulation.

5. An electrical conductor having a relatively dense and substantially non-porous cured polymeric insulation thereon, comprising a conductor and a layer of insulation comprising the cured product in approximate parts by weight of: an ethylene-containing polymer in amount of 100 parts; mineral filler in an amount of about 15 to 200 parts; peroxide curing agent in an amount of about 0.5 to 10 parts; and, at least one organic titanate selected from the group consisting of tetrakis (2-ethylhexyl) titanate, tetrabutyl titanate, and a mixed alkyl titanate comprising about 85 parts isopropyl $C_3$ by weight and about 15 parts stearyl $C_{18}$ by weight in an amount of about 2 to 10 parts by weight per 100 parts by weight of the mineral filler.

6. The electrical conductor having a relatively dense and substantially non-porous cured polymeric insulation of claim 5, wherein the organic titanate is present in an amount of about 2 to 4 parts by weight per 100 parts by weight of the mineral filler.

7. An electrical conductor having a relatively dense and substantially non-porous cured polymeric insulation thereon, comprising a conductor and a layer of insulation comprising the cured product in approximate parts by weight of: an ethylene-containing polymer selected from the group consisting of polyethylene, copolymers of ethylene and vinyl acetate, copolymers of ethylene and propylene, and terpolymers of ethylene and propylene with a diene, and mixtures thereof in an amount of 100 parts; at least one mineral filler selected from the group consisting of aluminum silicate, magnesium oxide, titanium dioxide, silica, and glass in amounts of about 15 to 200 parts; tertiary organic peroxide curing agent in an amount of about 0.5 to 10 parts; and, at least one organic titanate selected from the group consisting of tetrakis (2-ethylhexyl) titanate, tetrabutyl titanate, and a mixed alkyl titanate comprising about 85 parts isopropyl $C_3$ by weight and about 15 parts stearyl $C_{18}$ by weight in an amount of about 2 to 10 parts by weight per 100 parts by weight of the mineral filler.

8. The electrical conductor having a relatively dense and substantially non-porous cured polymer insulation of claim 7, wherein the ethylene-containing polymer comprises polyethylene, the mineral filler comprises clay, and the organic titanate is present in an amount of about 2 to 4 parts by weight per 100 parts by weight of the mineral filler.

* * * * *